US008225610B2

(12) United States Patent
Reed et al.

(10) Patent No.: US 8,225,610 B2
(45) Date of Patent: Jul. 24, 2012

(54) FUEL DELIVERY SYSTEM AND METHOD OF ASSEMBLING THE SAME

(75) Inventors: James Eric Reed, Greenville, SC (US); Arthur S. Peck, Greenville, SC (US)

(73) Assignee: General Electric Company, Schenectady, NY (US)

( * ) Notice: Subject to any disclaimer, the term of this patent is extended or adjusted under 35 U.S.C. 154(b) by 897 days.

(21) Appl. No.: 12/330,229

(22) Filed: Dec. 8, 2008

(65) Prior Publication Data

US 2010/0139279 A1 Jun. 10, 2010

(51) Int. Cl.
*F02C 1/00* (2006.01)

(52) U.S. Cl. ........................................................ 60/734

(58) Field of Classification Search .................... 60/737, 60/740, 742, 746, 748, 734, 752; 431/181, 431/187–188

See application file for complete search history.

(56) References Cited

U.S. PATENT DOCUMENTS

| | | | | |
|---|---|---|---|---|
| 6,070,411 | A | 6/2000 | Iwai et al. | |
| 6,123,273 | A | 9/2000 | Loprinzo et al. | |
| 6,256,995 | B1 | 7/2001 | Sampath et al. | |
| 6,457,316 | B1 | 10/2002 | Czachor et al. | |
| 6,484,489 | B1 | 11/2002 | Foust et al. | |
| 7,225,996 | B2 | 6/2007 | Kobayashi et al. | |
| 7,287,382 | B2 * | 10/2007 | Henriquez | 60/739 |
| 2004/0177615 | A1 * | 9/2004 | Martling | 60/740 |
| 2007/0151255 | A1 * | 7/2007 | Johnson et al. | 60/776 |
| 2010/0139238 | A1 * | 6/2010 | Hall et al. | 60/39.463 |

* cited by examiner

*Primary Examiner* — Phutthiwat Wongwian

(74) *Attorney, Agent, or Firm* — Armstrong Teasdale LLP

(57) ABSTRACT

A method of assembling a fuel delivery system is provided. The method includes providing a base that includes a surface, a receptacle extending into the base from the surface along a longitudinal axis, and a plurality of channels extending into the base from the receptacle. Each of the plurality of channels includes an inlet end and an outlet end, and each of the plurality of channels intersects the receptacle at the outlet end, wherein the receptacle and the plurality of channels are formed integrally within the base such that the plurality of outlet ends are spaced axially from one another. The method further includes securing a fuel nozzle within the receptacle, the fuel nozzle including a plurality of separate flow paths, wherein each of the plurality of channels is in flow communication with one of the plurality of separate flow paths.

20 Claims, 8 Drawing Sheets

FUEL DELIVERY SYSTEM AND METHOD OF ASSEMBLING THE SAME

BACKGROUND OF THE INVENTION

The field of this disclosure relates generally to fuel delivery systems and, more particularly, to a fuel delivery system and a method of assembling the same.

Known gas turbines include a combustor that mixes fuel with compressed air and ignites the fuel/air mixture to generate a flow of combustion gases that facilitates driving a turbine. At least some known combustors have a fuel delivery system that delivers fuel to a secondary fuel nozzle for injection into a combustion chamber at specified time intervals that suit generating a variety of flame strengths and/or burn sequences (i.e., a variety of operational modes of the gas turbine).

However, at least some known fuel delivery systems for secondary fuel nozzles may be prone to failure (e.g., fuel leakages) resulting from mechanical and/or thermal stresses produced on or around the gas turbine. As such, it would be useful to have a fuel delivery system that facilitates minimizing failure and facilitates minimizing a cost associated with manufacturing the fuel delivery system.

BRIEF DESCRIPTION OF THE INVENTION

In one aspect, a method of assembling a fuel delivery system is provided. The method includes providing a base that includes a surface, a receptacle extending into the base from the surface along a longitudinal axis, and a plurality of channels extending into the base from the receptacle. Each of the plurality of channels includes an inlet end and an outlet end, and each of the plurality of channels intersects the receptacle at the outlet end, wherein the receptacle and the plurality of channels are formed integrally within the base such that the plurality of outlet ends are spaced axially from one another. The method further includes securing a fuel nozzle within the receptacle, the fuel nozzle including a plurality of separate flow paths, wherein each of the plurality of channels is in flow communication with one of the plurality of separate flow paths.

In another aspect, a fuel delivery system is provided. The fuel delivery system includes a base configured to receive a fuel nozzle. The base includes a surface, a receptacle extending into the base from the surface along a longitudinal axis, and a plurality of channels extending into the base from the receptacle. Each of the plurality of channels includes an inlet end and an outlet end. Each of the plurality of channels intersects the receptacle at the outlet end, wherein the receptacle and the plurality of channels are formed integrally within the base such that the plurality of outlet ends are spaced axially from one another.

DETAILED DESCRIPTION OF THE INVENTION

The following detailed description illustrates a fuel delivery system and a method of assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, a fuel delivery system for use with a gas turbine. However, it is contemplated that this disclosure has general application to fuel delivery systems in a broad range of systems and in a variety of industrial and/or consumer applications.

Figure 1:
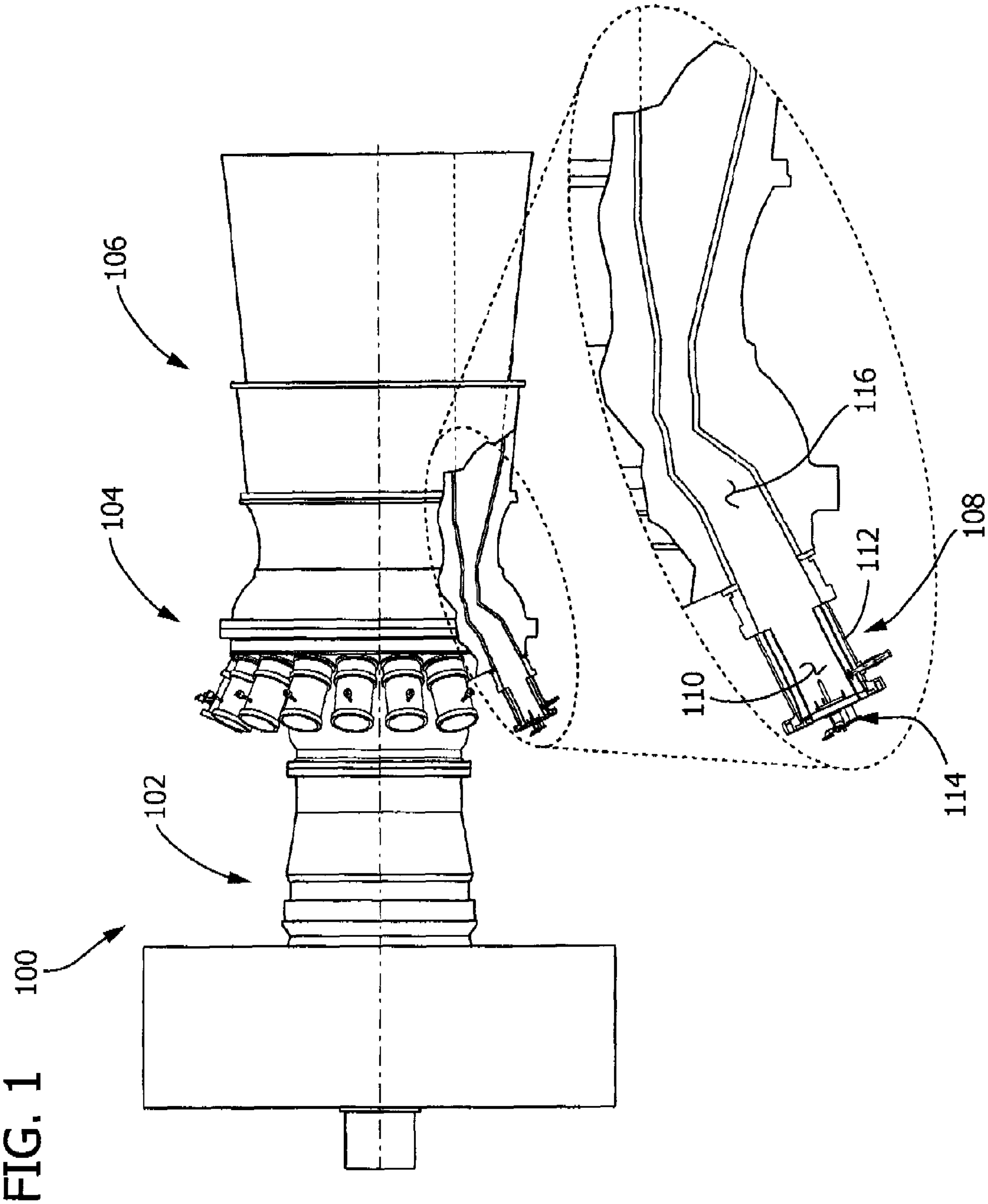
FIG. 1 is a schematic diagram of a gas turbine.

FIG. 1 is a schematic diagram of an exemplary gas turbine 100. Gas turbine 100 includes a compressor 102, a combustion system 104, and a turbine 106. Combustion system 104 includes a plurality of combustors 108 located about a periphery of gas turbine 100. In one embodiment, combustion system 104 includes fourteen combustors 108. Alternatively, combustion system 104 may include any suitable number of combustors 108 that enables gas turbine 100 to function as described herein. Each combustor 108 has a combustion chamber 110 that is defined by a generally cylindrical outer casing 112 and an end cover assembly 114 coupled (e.g., bolted) to outer casing 112 such that a transition duct 116 extends from combustion chamber 110 to turbine 106. In operation, compressed air is directed from compressor 102 to combustor 108, where the compressed air is mixed with fuel and ignited in combustion chamber 110 to produce hot combustion gases that are directed through transition duct 116 and toward turbine 106 for use in driving turbine 106. As used herein, the term "air" refers to any gas or combination of gases and is not limited to the combination of Earth's atmospheric gases commonly referred to as "air."

Figure 2:
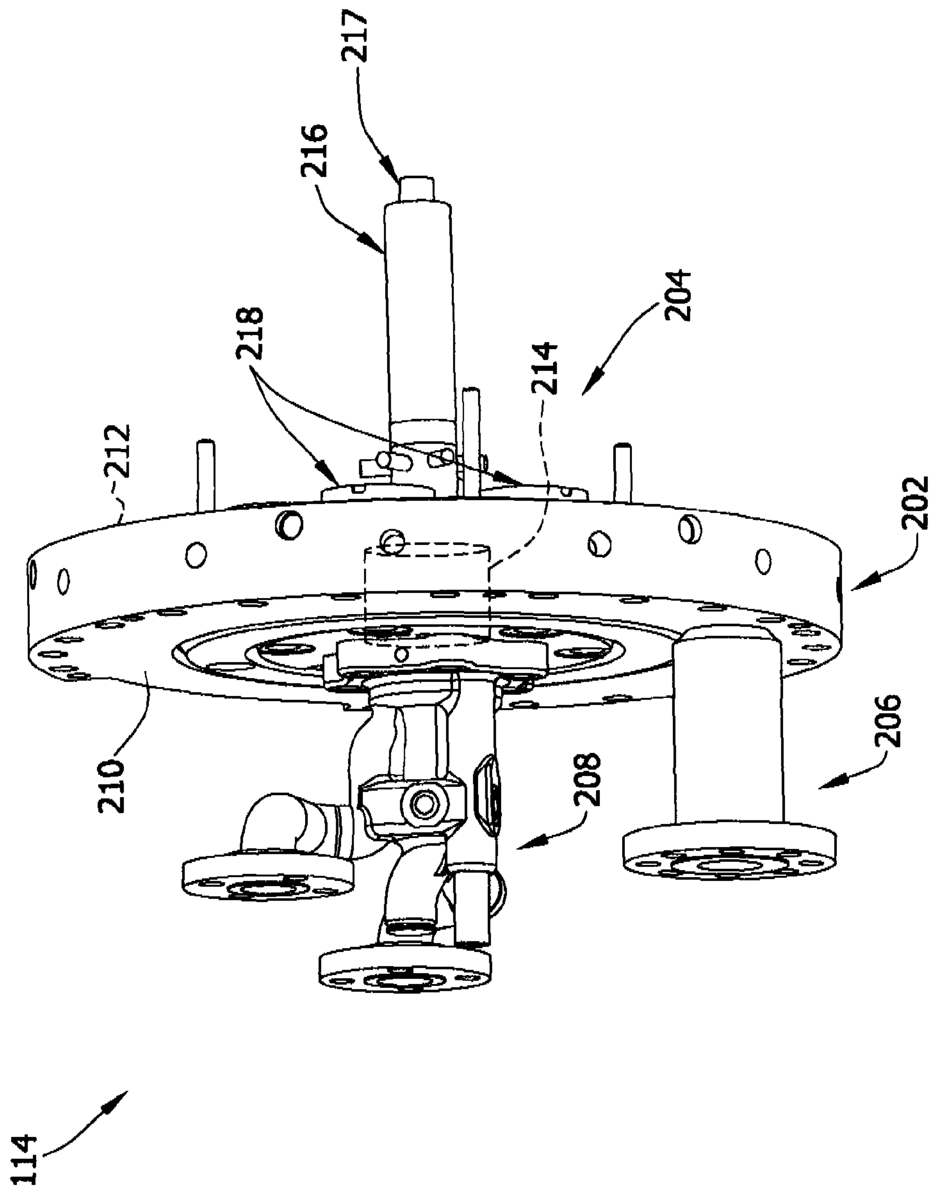
FIG. 2 is an enlarged side view of an end cover assembly for use in the gas turbine shown in FIG. 1.

FIG. 2 is an enlarged side view of end cover assembly 114. In the exemplary embodiment, end cover assembly 114 includes an end cover 202, a nozzle assembly 204, a first fuel delivery system 206, and a second fuel delivery system 208. End cover 202 is generally annular and includes a first face 210, a second face 212, and a central aperture 214 extending from first face 210 through second face 212. Nozzle assembly 204 includes a centrally located secondary fuel nozzle 216 and an array of primary fuel nozzles 218 circumscribing secondary fuel nozzle 216. In the exemplary embodiment, nozzle assembly 204 includes six primary fuel nozzles 218 and one secondary fuel nozzle 216. Alternatively, nozzle assembly 204 may include any number of primary fuel nozzles 218 and/or secondary fuel nozzles 216 that enables gas turbine 100 to function as described herein. In the exemplary embodiment, secondary fuel nozzle 216 includes a plurality of separate, internal flow paths that converge at a discharge tip 217. In operation, secondary fuel nozzle 216 is secured (e.g., bolted and/or threaded) within second fuel delivery system 208 (as described below), and second fuel delivery system 208 is bolted to end cover first face 210 such that secondary fuel nozzle 216 extends through central aperture 214. End cover 202 is then coupled to outer casing 112 of combustor 108 (shown in FIG. 1) such that combustion chamber 110 (shown in FIG. 1) is covered and such that primary fuel nozzles 218 and secondary fuel nozzle 216 protrude into combustion chamber 110.

Figure 3:
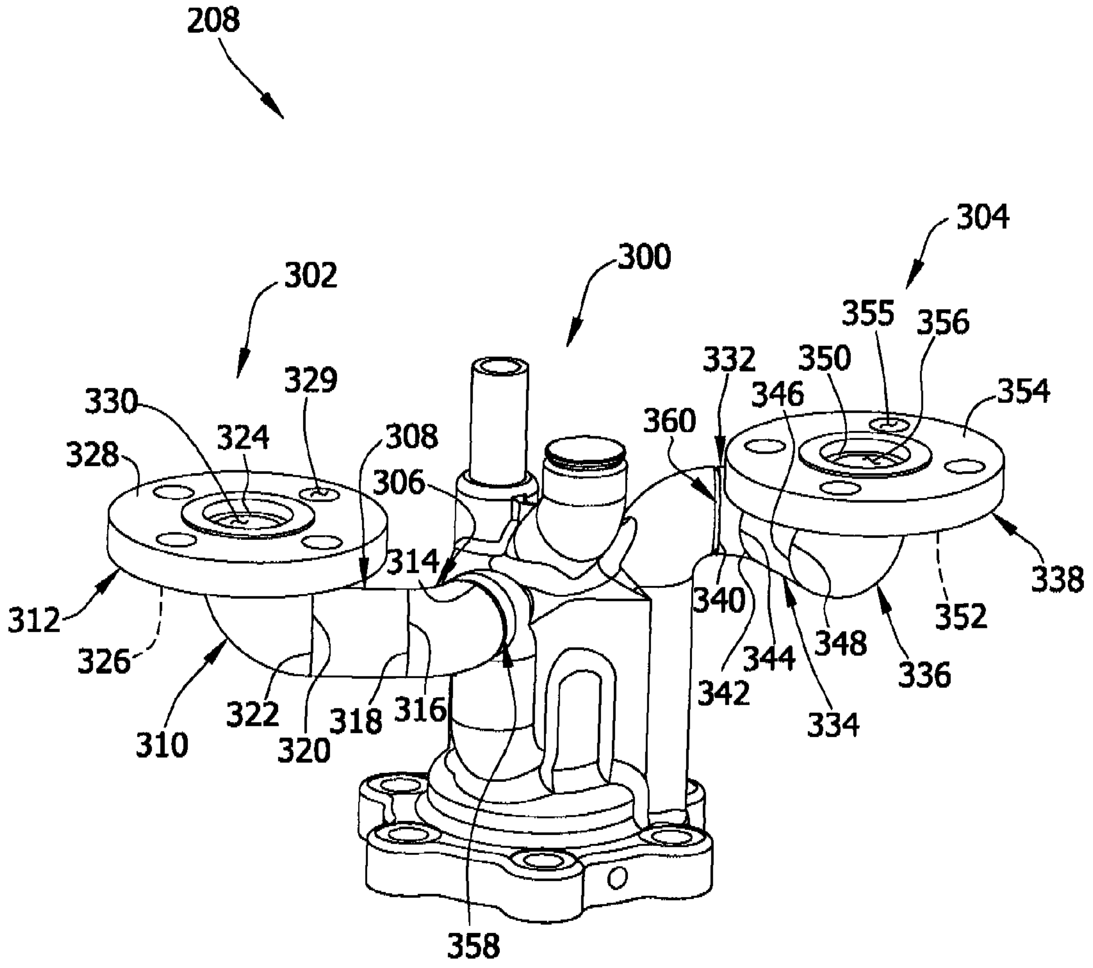
FIG. 3 is an enlarged perspective view of a fuel delivery system for use in the end cover assembly shown in FIG. 2.

FIG. 3 is an enlarged perspective view of second fuel delivery system 208. Second fuel delivery system 208 includes a base 300, a first fluid transfer line 302, and a second fluid transfer line 304. First fluid transfer line 302 includes a first proximal elbow 306, a first intermediate section 308, a first distal elbow 310, and a first flange 312. First proximal elbow 306 has a first end 314 and a second end 316, and first intermediate section 308 has a first end 318 and a second end 320. First distal elbow 310 has a first end 322 and a second end 324, and first flange 312 has a first surface 326, a second surface 328, and a plurality of first apertures 329 extending from first surface 326 through second surface 328. First proximal elbow first end 314 is coupled (e.g., welded) to base 300 (as described below), and first proximal elbow second end 316 is coupled (e.g., welded) to first intermediate section first end 318. First intermediate section second end 320 is coupled (e.g., welded) to first distal elbow first end 322, and first distal elbow second end 324 is coupled (e.g., welded) to first flange first surface 326 such that a first fluid passageway 330 is defined by first fluid transfer line 302 from first flange second surface 328 through first proximal elbow first end 314. In another embodiment, first proximal elbow 306, first intermediate section 308, and first distal elbow 310 may be formed integrally together as a first single section and bent into an orientation that facilitates coupling the first single section between base 300 and first flange 312, as described herein.

Second fluid transfer line 304 includes a second proximal elbow 332, a second intermediate section 334, a second distal elbow 336, and a second flange 338. Second proximal elbow 332 has a first end 340 and a second end 342, and second intermediate section 334 has a first end 344 and a second end 346. Second distal elbow 336 has a first end 348 and a second end 350, and second flange 338 has a first surface 352, a second surface 354, and a plurality of second apertures 355 extending from first surface 352 through second surface 354. Second proximal elbow first end 340 is coupled (e.g., welded) to base 300 (as described below), and second proximal elbow second end 342 is coupled (e.g., welded) to second intermediate section first end 344. Second intermediate section second end 346 is coupled (e.g., welded) to second distal elbow first end 348, and second distal elbow second end 350 is coupled (e.g., welded) to second flange first surface 352 such that a second fluid passageway 356 is defined by second fluid transfer line 304 from second flange second surface 354 through second proximal elbow first end 340. In another embodiment, second proximal elbow 332, second intermediate section 334, and second distal elbow 336 may be formed integrally together as a second single section and bent into an orientation that facilitates coupling the second single section between base 300 and second flange 338, as described herein.

Figure 4:
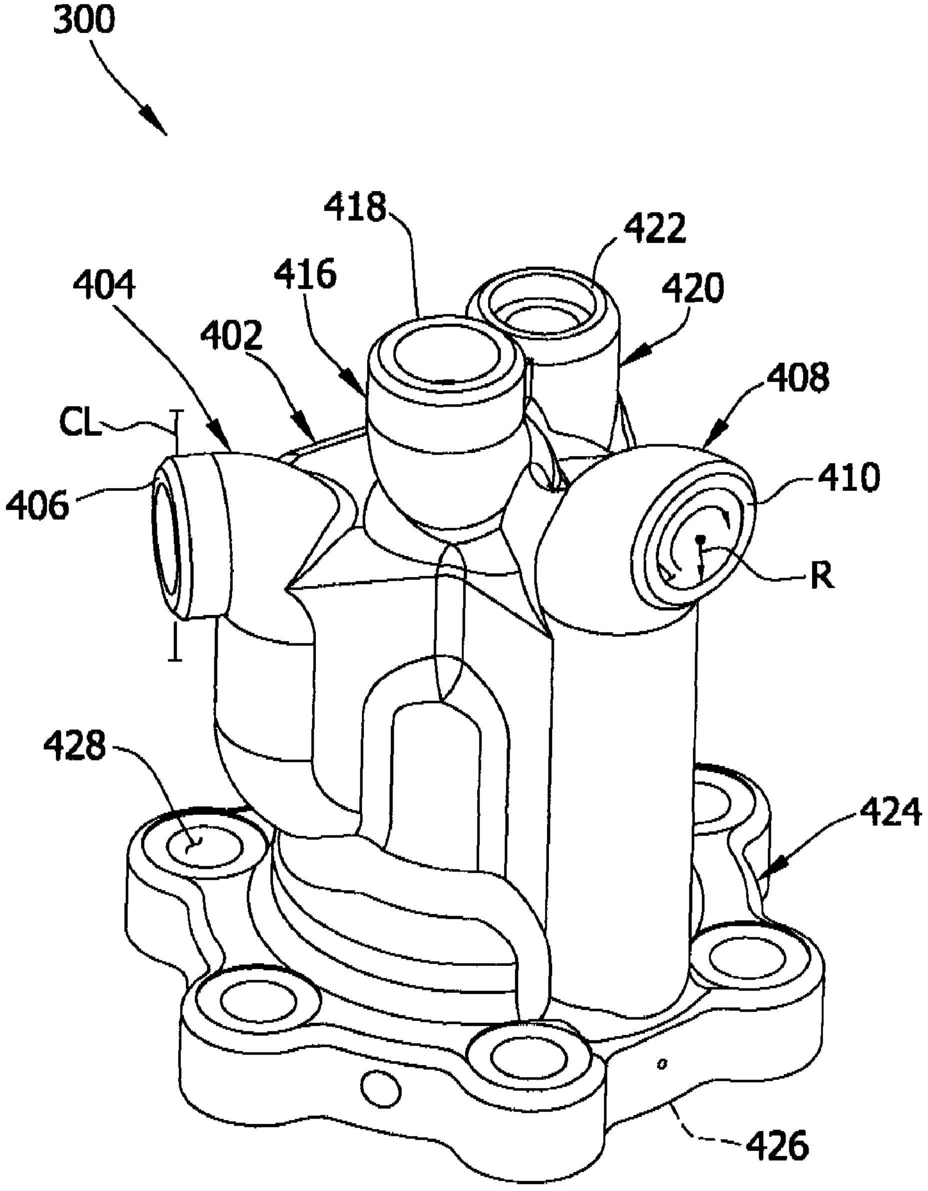
FIG. 4 is a perspective view of a base for use in the fuel delivery system shown in FIG. 3.

FIG. 4 is a perspective view of base 300. In the exemplary embodiment, base 300 includes a body 402, a first arm 404 extending from body 402 to a first connection surface 406, a second arm 408 extending from body 402 to a second connection surface 410, a third arm 412 (shown in FIG. 7) extending from body 402 to a third connection surface 414 (shown in FIG. 7), a fourth arm 416 extending from body 402 to a fourth connection surface 418, and a fifth arm 420 extending from body 402 to a fifth connection surface 422. First connection surface 406, second connection surface 410, and third connection surface 414 are oriented to be substantially perpendicular to fourth connection surface 418 and fifth connection surface 422.

Body 402 has generally annular contour and includes a mounting flange 424 that defines a mounting surface 426 and a plurality of mounting apertures 428. Base 300 is formed via a molding process (e.g., a casting process) such that body 402, first arm 404, second arm 408, third arm 412, fourth arm 416, fifth arm 420, and mounting flange 424 are formed integrally together. As used herein, the term “formed integrally” refers to a structure formed as one piece (e.g., via a casting process), and does not refer to separately formed pieces that are joined together (e.g., via a welding process).

Figure 5:
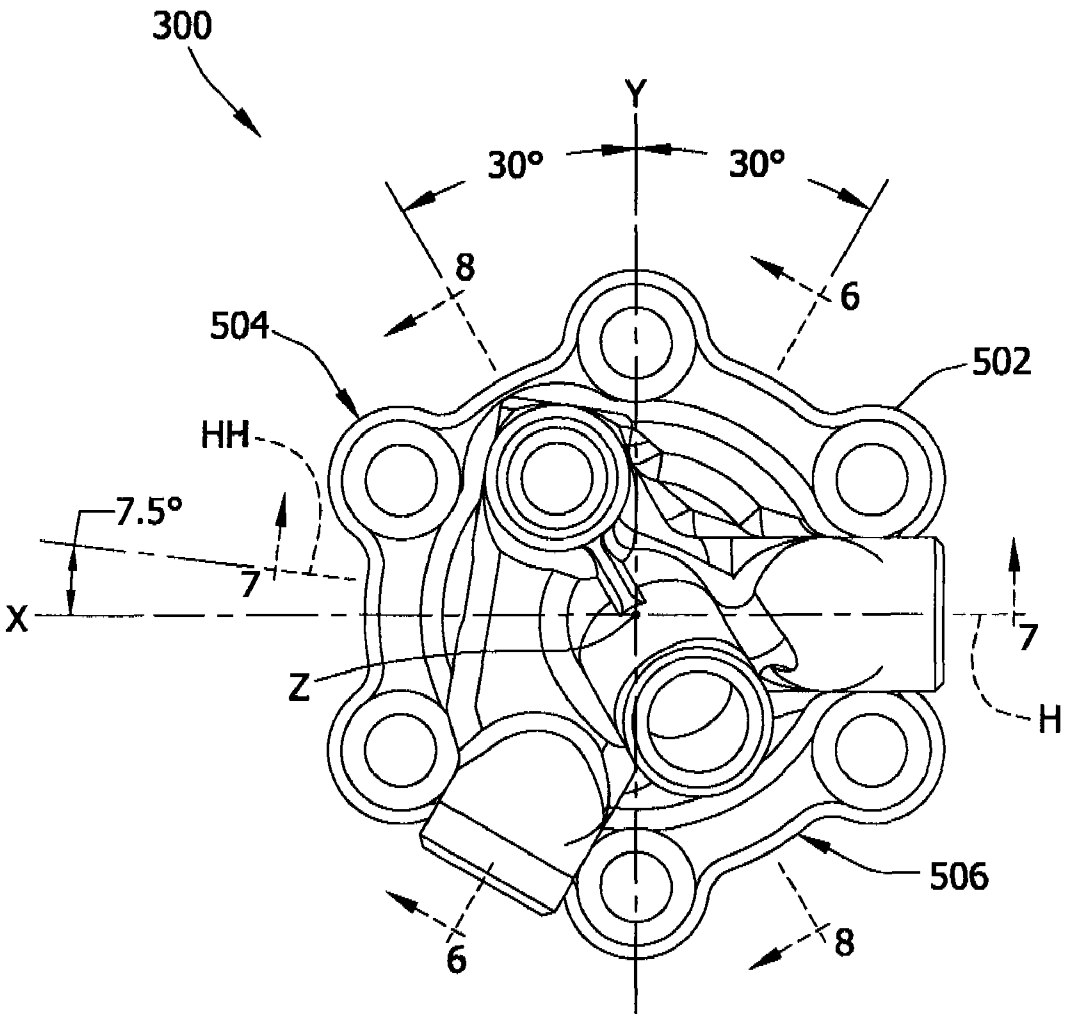
FIG. 5 is a plan view of the base shown in FIG. 4.

FIG. 5 is a plan view of base 300. Base 300 has a periphery 502 and has mutually perpendicular axes X, Y, and Z extending therethough. As used herein, the term “longitudinal axis” refers to axis Z. In the exemplary embodiment, periphery 502 has a generally star-shaped contour, defining a number of peaks 504 and a number of valleys 506. Alternatively, periphery 502 may have any suitable contour that enables base 300 to function as described herein. To facilitate illustrating internal components of base 300 in FIGS. 6-8, cross-sections 6-6, 7-7, and 8-8 are taken through base 300. Cross-section 6-6 extends through an intersection of axes X, Y, and Z and is oriented about 30° clockwise of axis Y, and cross-section 8-8 extends through the intersection of axes X, Y, and Z and is oriented about 30° counterclockwise of axis Y. Cross-section 7-7 extends through the intersection of axes X, Y, and Z and is oriented such that a first half H of cross-section 7-7 is taken along axis X and such that a second half HH of cross-section 7-7 is taken about 7.5° clockwise of axis X.

Figure 6:
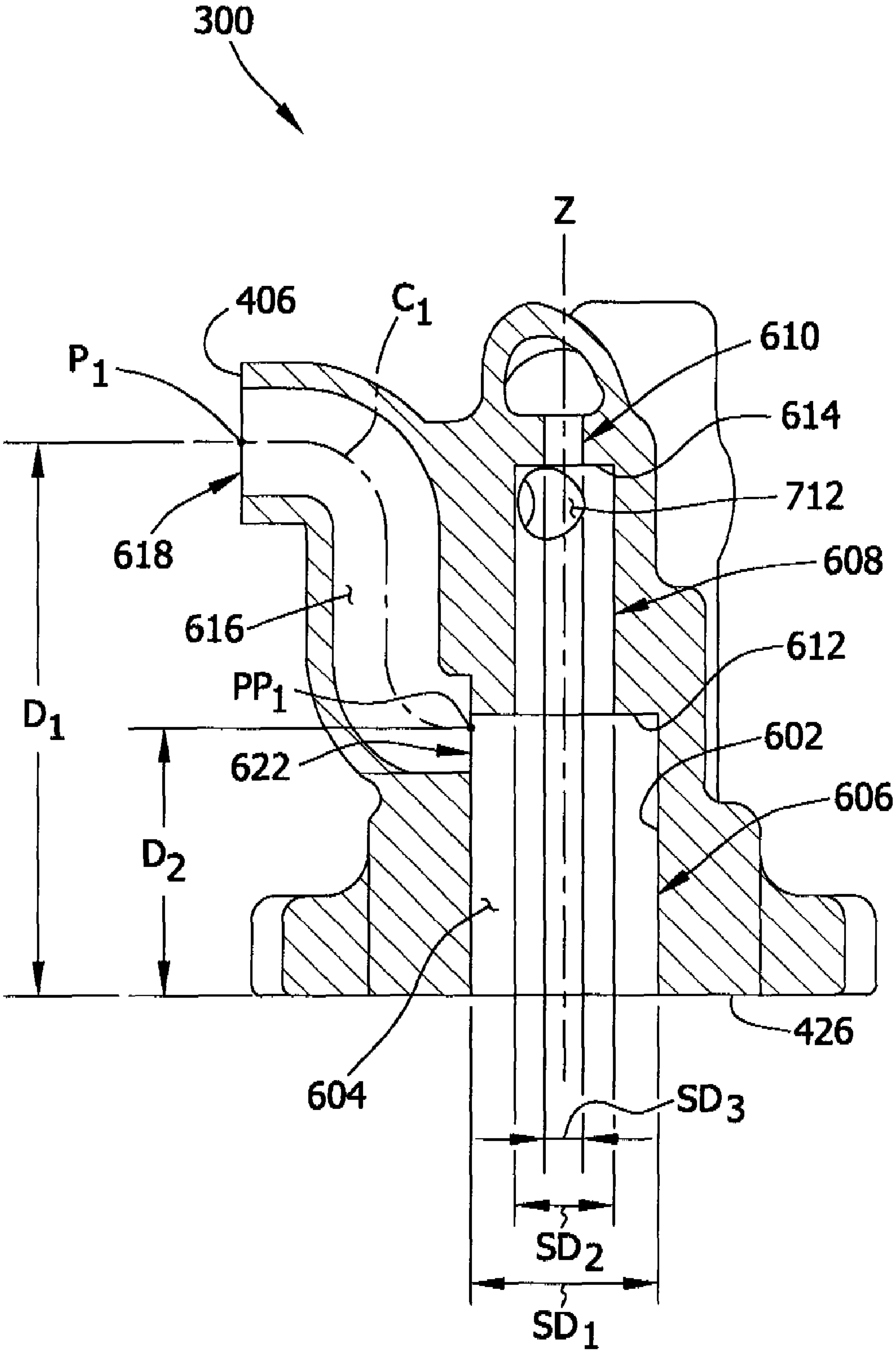
FIG. 6 is a sectional view of the base shown in FIG. 5 and taken along section 6-6.

FIG. 6 is a sectional view of base 300 taken along section 6-6. Base 300 has an interior surface 602 that defines a secondary fuel nozzle receptacle 604 that extends substantially perpendicularly inward from mounting surface 426. Receptacle 604 is formed circumferentially about axis Z and is sized to receive secondary fuel nozzle 216 (shown in FIG. 2). Receptacle 604 has a first portion 606, a second portion 608, and a third portion 610. First portion 606 has a first diameter $SD_1$, second portion 608 has a second diameter $SD_2$ that is shorter than first diameter $SD_1$, and third portion 610 has a third diameter $SD_3$ that is shorter than second diameter $SD_2$. First portion 606 abuts second portion 608 at a first circumferential lip 612, and second portion 608 abuts third portion 610 at a second circumferential lip 614. First lip 612 and second lip 614 extend substantially parallel to one another and substantially perpendicular to interior surface 602. In the exemplary embodiment, receptacle 604 is formed within base 300 via a molding process (e.g., a casting process) and may subsequently be finish-machined to add desired structural features (e.g., threads), but receptacle 604 is not formed within base 300 via a machining process (e.g., via a boring process or a drilling process).

Base 300 defines a first channel 616 that extends from a first inlet end 618, which is defined by first connection surface 406, to a first outlet end 622, which is defined by interior surface 602, such that first channel 616 is in flow communication with first portion 606 of receptacle 604. First channel 616 has a first central axis $C_1$ that extends through first inlet end 618 at a first inlet reference point $P_1$ and through first outlet end 622 at a first outlet reference point $PP_1$. First inlet reference point $P_1$ is spaced a first distance $D_1$ from mounting surface 426, and first outlet reference point $PP_1$ is spaced a second distance $D_2$ from mounting surface 426. First distance $D_1$ is longer than second distance $D_2$. In the exemplary embodiment, first channel 616 has a substantially curvilinear contour (i.e., has rounded bends, as opposed to 90° corners) to facilitate generating a smoother flow of fluid through first channel 616 and toward receptacle 604. In one embodiment, first channel 616 has an S-shaped profile. Alternatively, first channel 616 may have any suitable profile that enables base 300 to function as described herein. First channel 616 is formed within base 300 via a molding process (e.g., a casting process) and may subsequently be finish-machined to add desired structural features (e.g., threads), but first channel 616 is not formed within base 300 via a machining process (e.g., via a boring process or a drilling process). As used herein, the term diameter is defined as a distance across any cross-sectional shape (e.g., a rectangle, a triangle, etc.) and is not limited to only describing a distance across circular or elliptical cross-sectional shapes.

Figure 7:
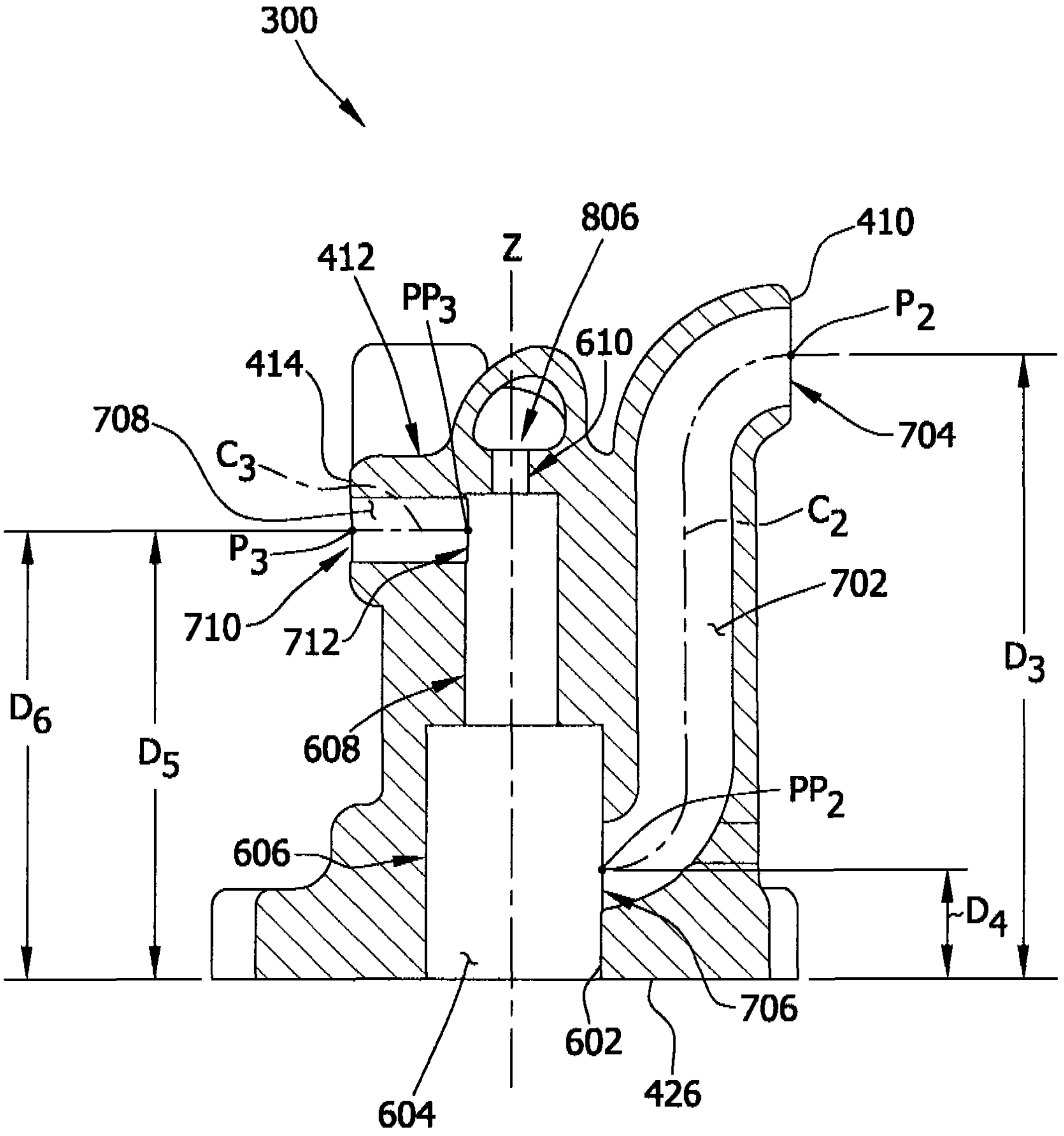
FIG. 7 is a sectional view of the base shown in FIG. 5 and taken along section 7-7.

FIG. 7 is a cross-sectional view of base 300 taken along section 7-7. In the exemplary embodiment, base 300 defines a second channel 702 that extends from a second inlet end 704, which is defined by second connection surface 410, to a second outlet end 706, which is defined by interior surface 602, such that second channel 702 is in flow communication with first portion 606 of receptacle 604. Second channel 702 has a second central axis $C_2$ that extends through second inlet end 704 at a second inlet reference point $P_2$ and through second outlet end 706 at a second outlet reference point $PP_2$. Second inlet reference point $P_2$ is spaced a third distance $D_3$ from mounting surface 426, and second outlet reference point $PP_2$ is spaced a fourth distance $D_4$ from mounting surface 426. Third distance $D_3$ is longer than fourth distance $D_4$. In the exemplary embodiment, second channel 702 is formed with a substantially curvilinear contour (i.e., with rounded bends, as opposed to 90° corners) to facilitate generating a smoother flow of fluid through second channel 702 and toward receptacle 604. In one embodiment, second channel 702 is formed with an S-shaped profile. Alternatively, second channel 702 may have any suitable profile that enables base 300 to function as described herein. In the exemplary embodiment, second channel 702 is formed within base 300 via a molding process (e.g., a casting process) and may subsequently be finish-machined to add desired structural features (e.g., threads), but second channel 702 is not formed within base 300 via a machining process (e.g., via a boring process or a drilling process).

In the exemplary embodiment, base 300 defines a third channel 708 that extends from a third inlet end 710, which is defined by third connection surface 414, to a third outlet end 712, which is defined by interior surface 602, such that third channel 708 is in flow communication with second portion 608 of receptacle 604. Third channel 708 has a third central axis $C_3$ that extends through third inlet end 710 at a third inlet reference point $P_3$ and through third outlet end 712 at a third outlet reference point $PP_3$. Third inlet reference point $P_3$ is spaced a fifth distance $D_5$ from mounting surface 426, and third outlet reference point $PP_3$ is spaced a sixth distance $D_6$ from mounting surface 426. Fifth distance $D_5$ and sixth distance $D_6$ are substantially equal such that third central axis $C_3$ is substantially perpendicular to axis Z. In the exemplary embodiment, third channel 708 has a substantially linear profile. Alternatively, third channel 708 may have any suitable profile that enables base 300 to function as described herein. Third channel 708 is formed within base 300 via a molding process (e.g., a casting process) and may subsequently be finish-machined to add desired structural features (e.g., threads), but third channel 708 is not formed within base 300 via a machining process (e.g., via a boring process or a drilling process).

Figure 8:
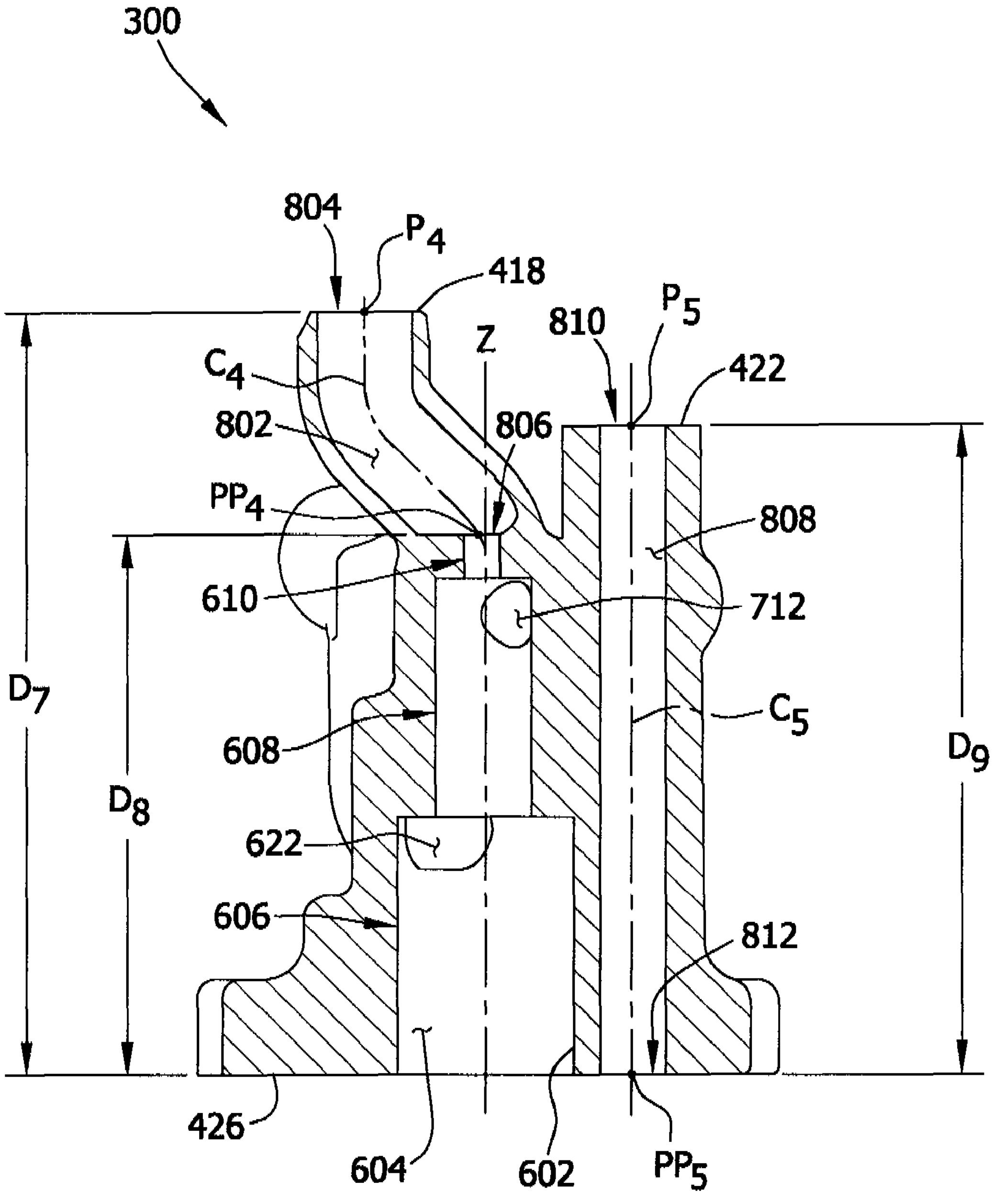
FIG. 8 is a sectional view of the base shown in FIG. 5 and taken along section 8-8.

FIG. 8 is a cross-sectional view of base 300 taken along section 8-8. In the exemplary embodiment, base 300 defines a fourth channel 802 that extends from a fourth inlet end 804, which is defined by fourth connection surface 418, to a fourth outlet end 806, which is defined by interior surface 602, such that fourth channel 802 is in flow communication with third portion 610 of receptacle 604. Fourth channel 802 has a fourth central axis $C_4$ that extends through fourth inlet end 804 at a fourth inlet reference point $P_4$ and through fourth outlet end 806 at a fourth outlet reference point $PP_4$. Fourth inlet reference point $P_4$ is spaced a seventh distance $D_7$ from mounting surface 426, and fourth outlet reference point $PP_4$ is spaced an eighth distance $D_8$ from mounting surface 426. Seventh distance $D_7$ is longer than eighth distance $D_8$. In the exemplary embodiment, fourth channel 802 is formed with a substantially curvilinear contour (i.e., with rounded bends, as opposed to 90° corners) to facilitate generating a smoother flow of fluid through fourth channel 802 and toward receptacle 604. In one embodiment, fourth channel 802 is formed with an S-shaped profile. Alternatively, fourth channel 802 may have any suitable profile that enables base 300 to function as described herein. Fourth channel 802 is formed within base 300 via a molding process (e.g., a casting process) and may subsequently be finish-machined to add desired structural features (e.g., threads), but fourth channel 802 is not formed within base 300 via a machining process (e.g., via a boring process or a drilling process).

In the exemplary embodiment, base 300 defines a fifth channel 808 that extends from a fifth inlet end 810, which is defined by fifth connection surface 422, to a fifth outlet end 812, which is defined by mounting surface 426. Fifth channel 808 has a fifth central axis $C_5$ that extends through fifth inlet end 810 at a fifth inlet reference point $P_5$ and through fifth outlet end 812 at a fifth outlet reference point $PP_5$. Fifth inlet reference point $P_5$ is spaced a ninth distance $D_9$ from mounting surface 426, and fifth outlet reference point $PP_5$ is aligned with mounting surface 426 such that fifth central axis $C_5$ is substantially parallel to axis Z and substantially perpendicular to mounting surface 426. In the exemplary embodiment, fifth channel 808 has a substantially linear profile. Alternatively, fifth channel 808 may have any suitable profile that enables base 300 to function as described herein. Fifth channel 808 is formed within base 300 via a molding process (e.g., a casting process) and may subsequently be finish-machined to add desired structural features (e.g., threads), but fifth channel 808 is not formed within base 300 via a machining process (e.g., via a boring process or a drilling process). In one embodiment, base 300 is formed via a molding process that uses at least one core (e.g., a ceramic core, a soluble wax core, etc.) to facilitate forming first channel 616, second channel 702, third channel 708, fourth channel 802, and/or fifth channel 808.

In the exemplary embodiment, seventh distance $D_7$ is longer than ninth distance $D_9$; ninth distance $D_9$ is longer than third distance $D_3$; third distance $D_3$ is longer than first distance $D_1$; and first distance $D_1$ is longer than fifth distance Ds. Additionally, eighth distance $D_8$ is longer than sixth distance $D_6$; sixth distance $D_6$ is longer than second distance $D_2$; and second distance $D_2$ is longer than fourth distance $D_4$.

To assemble end cover assembly 114, first fluid transfer line 302 is bonded (e.g., welded, brazed, etc.) to first connection surface 406 at a first joint 358 (shown in FIG. 3) such that first fluid passageway 330 is substantially concentrically aligned with first channel 616. Second fluid transfer line 304 is bonded (e.g., welded, brazed, etc.) to second connection surface 410 at a second joint 360 (shown in FIG. 3) such that second fluid passageway 356 is substantially concentrically aligned with second channel 702. First fluid transfer line 302 and second fluid transfer line 304 extend outwardly from base 300 such that first flange second surface 328 and/or second flange second surface 354 are oriented substantially parallel with one another, with fourth connection surface 418, and/or with fifth connection surface 422. In the exemplary embodiment, first joint 358 and/or second joint 360 are oriented such that a clearance CL (shown in FIG. 4) is defined in a radial direction R (shown in FIG. 4) to facilitate enabling first joint 358 and/or second joint 360 to be created using a butt-welding process, which facilitates strengthening the joint against oxidation, thermal stresses, and/or other potential sources of joint failure. In one embodiment, clearance CL is greater than about 0.25 inches. In another embodiment, clearance CL is greater than about 0.5 inches. In another embodiment, clearance CL is greater than about 1 inch. In some embodiments, first joint 358 and/or second joint 360 is created using a welding process other than a socket welding process. In other embodiments, first joint 358 and/or second joint 360 may be created using any suitable manufacturing process that enables second fuel delivery system 208 to function as described herein. Alternatively, first fluid transfer line 302 and/or second fluid transfer line 304 may be formed integrally together with base 300.

After first fluid transfer line 302 and/or second fluid transfer line 304 are coupled to base 300, secondary fuel nozzle 216 (shown in FIG. 2) is inserted into receptacle 604 such that secondary fuel nozzle 216 is secured within either first portion 606, second portion 608, and/or third portion 610 of receptacle 604 (e.g., via a threaded and/or bolted engagement). Secondary fuel nozzle 216 is oriented within receptacle 604 such that each of first channel 616, second channel 702, third channel 708, and/or fourth channel 802 is in flow communication with one of the separate flow paths within secondary fuel nozzle 216. After secondary fuel nozzle 216 is secured within receptacle 604, secondary fuel nozzle 216 is inserted through central aperture 214 of end cover 202 from first face 210 through second face 212, and base 300 is coupled to end cover 202 (e.g., via a plurality of bolts that extend through mounting apertures 428) such that mounting surface 426 is seated against end cover first face 210. After base 300 is coupled to end cover 202, end cover 202 is fastened to combustor outer casing 112 such that secondary fuel nozzle 216 and primary fuel nozzles 218 protrude into combustion chamber 110.

In the exemplary embodiment, a primary fuel supply is coupled to first fuel delivery system 206 via any suitable fasteners (e.g., bolts), and a secondary fuel supply is coupled to second fuel delivery system 208 via any suitable fasteners (e.g., bolts). Specifically, with respect to the secondary fuel supply, a first fluid supply (e.g., a tertiary fuel supply) is coupled to second surface 328 of first flange 312 via a plurality of bolts that extend through first apertures 329, a second fluid supply (e.g., a secondary fuel supply) is coupled to second surface 354 of second flange 338 via a plurality of bolts that extend through second apertures 355, a third fluid supply (e.g., a water supply) is coupled (e.g., bonded or bolted) to third connection surface 414, and/or a fourth fluid supply (e.g., an oil supply) is coupled (e.g., bonded or bolted) to fourth connection surface 418. In one embodiment, either the third fluid supply and/or the fourth fluid supply is not coupled to third connection surface 414 and/or fourth connection surface 418, respectively, and a plug is inserted into either third channel 708 (i.e., if water is not desirable to facilitate the combustion process) and/or fourth channel 802 (i.e., if oil is not desirable to facilitate the combustion process). In the exemplary embodiment, a flame detector flange is coupled (e.g., bonded or bolted) to fifth connection surface 422, a flame detector delivery tube is coupled (e.g., bolted) to the flame detector flange, and a flame detector probe is inserted through the flame detector tube, through fifth channel

808, and through central aperture 214 of end cover 202 to facilitate monitoring a flame in combustion chamber 110.

In operation, fuel is directed from the primary fuel supply to primary fuel nozzles 218 via first fuel delivery system 206, and fuel and/or other fluids are directed from the secondary fuel supply to secondary fuel nozzle 216 via second fuel delivery system 208. Specifically, with respect to secondary fuel nozzle 216, each of a first fluid (e.g., a tertiary fuel), a second fluid (e.g., a secondary fuel), a third fluid (e.g., water), and/or a fourth fluid (e.g., an oil) is directed toward one of the separate flow paths within secondary fuel nozzle 216 via first channel 616, second channel 702, third channel 708, and/or fourth channel 802, respectively. Each of the separate flow paths within secondary fuel nozzle 216 directs one of the fluids toward discharge tip 217, and secondary fuel nozzle 216 mixes, proximate discharge tip 217 (e.g., at a predetermined distance outward from discharge tip 217), the fluids with one another and with the compressed air from compressor 102 such that the fuel/air mixture can be ignited within combustion chamber 110.

The methods and systems described herein facilitate minimizing the number of individual components of a fuel delivery system. The methods and systems described herein also facilitate minimizing potential sources of failure (e.g., potential leakage points) in the fuel delivery system. The methods and systems described herein further facilitate increasing the reliability of the fuel delivery system and, thus, extending a useful life of the fuel delivery system, while also reducing a cost associated with manufacturing the fuel delivery system.

Exemplary embodiments of a fuel delivery system and a method of assembling the same are described above in detail. The methods and systems described herein are not limited to the specific embodiments described herein, but rather, components of the methods and systems may be utilized independently and separately from other components described herein. For example, the methods and systems described herein may have other applications not limited to practice with gas turbines, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A method of assembling a fuel delivery system, said method comprising:

providing a base that includes a surface disposed on a first face of a combustor end cover, a receptacle extending into the base from the surface along a longitudinal axis, and a plurality of channels extending through the base from the receptacle, wherein each of the plurality of channels includes an inlet end and an outlet end, each of the plurality of channels intersecting the receptacle at the outlet end, wherein the receptacle and the plurality of channels are formed integrally within the base such that the plurality of outlet ends are spaced axially from one another; and securing a fuel nozzle that extended from a second face of the combustor end cover within the receptacle, the fuel nozzle including a plurality of separate flow paths, wherein each of the plurality of channels is in flow communication with one of the plurality of separate flow paths.

2. A method in accordance with claim 1, wherein providing a base comprises providing the base with the receptacle and the plurality of channels formed integrally within the base via a casting process.

3. A method in accordance with claim 1, wherein providing a base comprises providing the base with the receptacle including a first portion having a first diameter, a second portion having a second diameter, and a third portion having a third diameter, the first diameter longer than the second diameter, and the second diameter longer than the third diameter.

4. A method in accordance with claim 1, wherein providing a base comprises providing the base with at least one of the plurality of channels having an S-shaped profile.

5. A method in accordance with claim 1, wherein providing a base comprises providing the base with at least one of the plurality of channels having a substantially linear profile.

6. A method in accordance with claim 1, wherein providing a base comprises providing the base with a channel that extends through the base such that the channel is not in flow communication with the receptacle.

7. A method in accordance with claim 1, further comprising coupling a fluid transfer line to the base such that the fluid transfer line is in flow communication with one of the plurality of channels.

8. A method in accordance with claim 7, wherein coupling a fluid transfer line to the base comprises coupling the fluid transfer line to the base via a welding process.

9. A method in accordance with claim 7, wherein coupling a fluid transfer line to the base comprises providing the fluid transfer line with a flange that is configured to be coupled to a fuel supply.

10. A method in accordance with claim 7, wherein coupling a fluid transfer line to the base comprises providing the fluid transfer line with a first elbow, a second elbow, and an intermediate section coupled between the first elbow and the second elbow.

11. A fuel delivery system comprising a base that disposed on a first face of a combustor end cover configured to receive a fuel nozzle that extended from a second face of the combustor end cover, said base comprising a surface, a receptacle extending into said base from said surface along a longitudinal axis, and a plurality of channels extending through said base from said receptacle, wherein each of said plurality of channels includes an inlet end and an outlet end, each of said plurality of channels intersecting said receptacle at said outlet end, wherein said receptacle and said plurality of channels are formed integrally within said base such that said plurality of outlet ends are spaced axially from one another.

12. A fuel delivery system in accordance with claim 11, wherein said receptacle and said plurality of channels are formed integrally within said base via a casting process.

13. A fuel delivery system in accordance with claim 11, wherein said receptacle comprises a first portion having a first diameter, a second portion having a second diameter, and a third portion having a third diameter, the first diameter longer than the second diameter, and the second diameter longer than the third diameter.

14. A fuel delivery system in accordance with claim 11, wherein at least one of said plurality of channels has an S-shaped profile.

15. A fuel delivery system in accordance with claim 11, wherein at least one of said plurality of channels has a substantially linear profile.

16. A fuel delivery system in accordance with claim 11, wherein said base comprises a channel that extends through said base such that said channel is not in flow communication with said receptacle.

17. A fuel delivery system in accordance with claim 11, further comprising a fluid transfer line coupled to said base such that said fluid transfer line is in flow communication with one of said plurality of channels.

18. A fuel delivery system in accordance with claim 17, wherein said fluid transfer line is coupled to said base via a welding process.

19. A fuel delivery system in accordance with claim 17, wherein said fluid transfer line comprises a flange that is configured to be coupled to a fuel supply.

20. A fuel delivery system in accordance with claim 17, wherein said fluid transfer line comprises a first elbow, a second elbow, and an intermediate section coupled between said first elbow and said second elbow.

* * * * *